United States Patent
James et al.

(10) Patent No.: US 11,044,049 B1
(45) Date of Patent: Jun. 22, 2021

(54) HYBRID UNEQUAL ERROR PROTECTION (UEP) FOR HETEROGENEOUS MULTI-SERVICE PROVISIONING

(71) Applicant: Naval Information Warfare Center, Pacific, San Diego, CA (US)

(72) Inventors: Justin O. James, San Diego, CA (US); Michael P. Daly, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 51 days.

(21) Appl. No.: 16/724,836

(22) Filed: Dec. 23, 2019

(51) Int. Cl.
 *H04L 1/00* (2006.01)
 *H04L 27/34* (2006.01)

(52) U.S. Cl.
 CPC .......... *H04L 1/007* (2013.01); *H04L 1/0003* (2013.01); *H04L 1/0026* (2013.01); *H04L 27/3405* (2013.01); *H04L 2001/0098* (2013.01)

(58) Field of Classification Search
 CPC ..... H04L 1/007; H04L 1/0003; H04L 1/0026; H04L 27/3405; H04L 2001/0098
 See application file for complete search history.

(56) References Cited

U.S. PATENT DOCUMENTS

| 6,658,059 B1 | 12/2003 | Iu et al. | |
|---|---|---|---|
| 7,856,584 B2* | 12/2010 | Ovchinnikov | H04L 1/0041 714/752 |
| 7,987,415 B2* | 7/2011 | Niu | H03M 13/6362 714/799 |
| 8,249,374 B2 | 8/2012 | Short et al. | |
| 8,654,834 B2* | 2/2014 | Cho | H04N 19/67 375/240.01 |
| 9,614,708 B1* | 4/2017 | Mohamed | H04B 7/04 |
| 9,953,246 B2 | 4/2018 | Bouchard et al. | |
| 2008/0152141 A1 | 6/2008 | Short et al. | |
| 2009/0022237 A1* | 1/2009 | Wang | H04L 1/007 375/260 |
| 2012/0307934 A1* | 12/2012 | Heidari | H04L 1/0003 375/295 |
| 2015/0244491 A1* | 8/2015 | Montorsi | H04L 1/0057 370/474 |

OTHER PUBLICATIONS

J. James et al., "Adaptive Multiresolution Modulation for Multimedia Traffic over Nakagami Fading Channels," International Journal of Wireless & Mobile Networks (Apr. 2012), pp. 1-20.

(Continued)

*Primary Examiner* — Freshteh N Aghdam
(74) *Attorney, Agent, or Firm* — Naval Information Warfare Center, Pacific; Kyle Eppele; J. Eric Anderson (57) ABSTRACT

A method and system are discussed for providing Unequal Error Protection (UEP) for heterogeneous multi-service provisioning. A transmitter in a network may determine a current status of the network. The transmitter may adaptively adjust a current asymmetric signal constellation and a current channel Forward Error Correction (FEC) coding rate based on the determined current status of the network, and initiate transmission of multi-service data, using the adaptively adjusted asymmetric signal constellation and the adaptively adjusted FEC coding rate for transmission of the multi-service data, based on hybrid Unequal Error Protection (UEP) transmission.

17 Claims, 7 Drawing Sheets

(56) References Cited

OTHER PUBLICATIONS

K. Yang et al., "Unequal Error Protection for Streaming Media Based on Rateless Codes," IEEE Transactions on Computer, vol. 61 No. 5, May 2012,pp. 666-675.
Odejide et al., "Adaptive Multiresolution Modulation for Multimedia Traffic in Dynamic Wireless Environment," 34th IEEE Sarnoff Symposium, May 3-4, 2011, 6 pages.
J. James et al., "Adaptive Multiresolution for Multimedia Traffic," IEEE Consumer Communication and Networking Conference (CCNC) (Jan. 9-12, 2012), pp. 697-698.
Goldsmith, Andrea, "Adaptive Modulation and Coding for Fading Channels," Proceedings of the 1999 IEEE Information Theory and Communications Workshop (1999), pp. 24-26.
Lu et al., "Asymmetric PSK Constellation Design to Minimize Distortion in PCM Data Transmission," Proc. IEEE Sarnoff Symposium (Apr. 2008), 5 Pages.
Van Der Schaar et al., "Classification-Based System for Cross-Layer Optimized Wireless Video Transmission," IEEE Trans. Multimedia, vol. 8, No. 5 (Oct. 2006), pp. 1082-1095.
Pahalawatta, P. et al., "Content-Aware Resource Allocation for Scalable Video Transmission to Multiple Users Over a Wireless Network," EEE International Conference on Acoustics, Speech and Signal Processing—ICASSP '07 (2007), pp. 853-856.
Van Der Schaar et al., "Cross-layer wireless multimedia transmission: Challenges, principles, and new paradigms," IEEE Wireless Commun. Mag. (Aug. 2005), pp. 50-58.
Liu, Q. et al., "Cross-Layer Combining of Adaptive Modulation and Coding With Truncated ARQ Over Wireless Links," IEEE Transactions on Wireless Communications, vol. 3, No. 5, (Sep. 2004), pp. 1746-1755.
Kompella, S. et al., "Cross-Layer Optimized Multipath Routing for Video Communications in Wireless Networks," IEEE J. Select. Areas Commun., vol. 25, No. 4, (May 2007), pp. 831-840.
Tang, J. et al., "Cross-Layer Resource Allocation Over Wireless Relay Networks for Quality of Service Provisioning," IEEE Journal on Selected Areas in Communications, vol. 25, No. 4 (May 2007), pp. 645-656.
Sundberg, C. et al., "Logarithmic PCM weighted QAM transmission over Gaussian and Rayleigh fading channels," IEEE Proceedings, Pt. F, vol. 134 (Oct. 1987), pp. 557-570.
Shiang, H. et al., "Multi-User Video Streaming Over Multi-Hop Wireless Networks: A Distributed, Cross-Layer Approach Based on Priority Queuing," IEEE Journal on Selected Areas in Communications, vol. 25, No. 4 (May 2007), pp. 770-785.
Liang, B. et al., "Packet Prioritization in Multihop Latency Aware Scheduling for Delay Constrained Communication," IEEE Journal on Selected Areas in Communications, vol. 25, No. 4 (May 2007), pp. 691-630.
Liu, Q. et al., "Queuing With Adaptive Modulation and Coding Over Wireless Links: Cross-Layer Analysis and Design," IEEE Transactions on Wireless Communications, vol. 4, No. 3 (May 2005), pp. 1142-1153.
Cox, R. et al., "Subband Speech Coding and Matched Convolutional Channel Coding for Mobile Radio Channels," IEEE Transactions on Signal Processing, vol. 39 (Aug. 1991), pp. 1717-1731.
Day, J. et al., "The OSI Reference Model," Processing of the IEEE, vol. 71, No. 12 (Dec. 1983), pp. 1334-1340.
Goldsmith, A. et al., "Variable-Rate Variable-Power MQAM for Fading Channels," IEEE Transactions on Communications, vol. 45, No. 10 (Oct. 1997), pp. 1218-1230.

\* cited by examiner

HYBRID UNEQUAL ERROR PROTECTION (UEP) FOR HETEROGENEOUS MULTI-SERVICE PROVISIONING

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 104069.

BACKGROUND

Multiservice applications are projected to become a central theme of the next-generation of wireless communications systems. Thus, heterogeneous multiservice provisioning may become a significant component of the systems. Future generations of communications systems may need to support a multitude of services with a wide variety of reliability requirements and data rates. For example, some errors may be tolerable for certain applications, such as video processing. However, these same errors may be unacceptable for other applications (e.g., mission critical data). Additionally complicating this issue, the quality of a wireless link in a contested mobile environment may be highly variable (due to node mobility, fluctuations in the propagation characteristics and interference levels, and limited battery resources) which may cause noteworthy variations in data delivery delays and packet losses (e.g., due to network flow congestion and finite length queues).

Conventionally, practical communications systems employ symmetric modulation. In symmetric modulation signal constellations, the minimum distance between any one symbol and all others is the same. This constellation design gives each bit within a modulated symbol approximately the same level of protection. Consequently, data encoded to each bit within a modulated symbol has approximately the same bit error rate (BER) characteristics.

Symmetric modulations are adequate for conventional stove-piped communications systems dedicated to only one function and QoS requirement. In such a system, symmetric modulation constellations are optimal, because the QoS requirement for all transmitted data is homogeneous. For newer communications systems with a multitude of different services with heterogeneous QoS requirements, symmetric modulation may be sub-optimal. When transmitting heterogeneous data using a symmetric modulation, the modulation and requisite SNR need to meet the more stringent QoS. This over-compensation may result in inefficient wasteful resource utilization, in the form of energy and/or spectral efficiency.

In network transmissions, Adaptive Multiresolution Modulation (AMM) permits adaptation of both the shape ($\beta$) and the size of an asymmetric signal constellation. The spectral efficiency gain achieved through the employment of AMM at the physical (PHY) layer (of the Open Systems Interconnection (OSI) model) may be substantial (e.g., up to fifty percent (50%) increase), especially at low and moderate carrier-to-noise ratio (CNR) (see, e.g., J. James et al., "Adaptive Multiresolution Modulation for Multimedia Traffic over Nakagami Fading Channels," International Journal of Wireless & Mobile Networks (April 2012), pp. 1-20 ("James 1" hereinafter) and J. James et al., "Adaptive Multiresolution Modulation for Multimedia Traffic," IEEE Consumer Communications and Networking Conference (CCNC) (Jan. 9-12, 2012), pp. 697-698 ("James 2" hereinafter)).

As further explanation of constellations, a constellation diagram is a representation of a signal modulated by a digital modulation scheme such as quadrature amplitude modulation or phase-shift keying. The diagram represents the signal as a two-dimensional xy-plane scatter diagram in the complex plane at symbol sampling instants. The angle of a point, measured counterclockwise from the horizontal axis, represents the phase shift of the carrier wave from a reference phase. The distance of a point from the origin represents a measure of the amplitude or power of the signal.

In a digital modulation system, information may be transmitted as a series of samples, each occupying a uniform time slot. During each sample, the carrier wave has a constant amplitude and phase which may be restricted to one of a finite number of values, so each sample encodes one of a finite number of "symbols", which in turn represent one or more binary digits (bits) of information. Each symbol may be encoded as a different combination of amplitude and phase of the carrier, so each symbol may be represented by a point on the constellation diagram. The constellation diagram may represent all the possible symbols that can be transmitted by the system as a collection of points. In a frequency or phase modulated signal, the signal amplitude is constant, so the points lie on a circle around the origin.

The carrier representing each symbol can be created by adding together different amounts of a cosine wave representing the "I" or in-phase carrier, and a sine wave, shifted by 90° from the I carrier called the "Q" or quadrature carrier. Thus, each symbol may be represented by a complex number, and the constellation diagram may be regarded as a complex plane, with the horizontal real axis representing the I component and the vertical imaginary axis representing the Q component. A coherent detector may independently demodulate these carriers. The principle of using two independently modulated carriers is the foundation of quadrature modulation. In pure phase modulation, the phase of the modulating symbol is the phase of the carrier itself.

A "signal space diagram" refers to an ideal constellation diagram showing the correct position of the point representing each symbol. After passing through a communication channel, due to electronic noise or distortion added to the signal, the amplitude and phase received by the demodulator may differ from the correct value for the symbol. When plotted on a constellation diagram, the point representing that received sample may be offset from the correct position for that symbol. For example, a vector signal analyzer can display the constellation diagram of a digital signal by sampling the signal and plotting each received symbol as a point. The result is a "ball" or "cloud" of points surrounding each symbol position. For example, measured constellation diagrams may be used to recognize the type of interference and distortion in a signal.

With regard to error protection, at the PHY layer, there are three techniques that may facilitate Unequal Error Protection (UEP): 1) increase the transmission power while sending high priority bits; 2) use channel coding with varying levels of error protection; and/or 3) employ a suitable multiresolution (hierarchical) modulation scheme.

An example technique using UEP is discussed in K. Yang, et al., "Unequal Error Protection for Streaming Media Based on Rateless Codes," *IEEE Transactions on Computers*, vol. 61 no. 5, pp. 666-675, May 2012 ("Yang" hereinafter).

Based on the discussion above, there is clearly a need for improved techniques for improving efficiency of heterogeneous multiservice content distribution across disadvantaged and/or contested wireless communications channels.

SUMMARY

A method and system are discussed that provide Unequal Error Protection (UEP) for heterogeneous multi-service provisioning. A transmitter in a network may determine a current status of the network. The transmitter may adaptively adjust a current asymmetric signal constellation and a current channel Forward Error Correction (FEC) coding rate based on the determined current status of the network, and initiate transmission of multi-service data, using the adaptively adjusted asymmetric signal constellation and the adaptively adjusted FEC coding rate for transmission of the multi-service data, based on hybrid UEP transmission.

This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DETAILED DESCRIPTION

A method and system are disclosed herein for providing Unequal Error Protection (UEP) for heterogeneous multi-service provisioning. The method and system each provide for determining, at a transmitter in a network, a current status of the network; adaptively adjusting a current asymmetric signal constellation and a current channel Forward Error Correction (FEC) coding rate based on the determined current status of the network; and initiating transmission of multi-service data, using the adaptively adjusted asymmetric signal constellation and the adaptively adjusted FEC coding rate for transmission of the multi-service data, based on hybrid-UEP transmission.

Example techniques discussed herein provide hybrid-UEP, based on a network link adaptation strategy, for efficient heterogeneous multiservice content distribution across disadvantaged and/or contested wireless communications channels. Hybrid-UEP permits adaptation of both the shape and the size of the asymmetric signal constellation, as well as channel Forward Error Correction (FEC) coding rate, with a goal of improving the throughput for multi-service data while fulfilling the distinct Quality of Service (QoS) packet error rate (PER) requirements for each traffic type under different channel conditions. For example, a hybrid-UEP scheme may employ Unequal Error Protection by channel coding (ADC) in a low carrier-to-noise ratio (CNR) region to provide increased robustness, and may employ UEP by Adaptive Multiresolution Modulation (AMM) in the moderate to high CNR regions to increase spectral efficiency.

The spectral efficiency gain achieved through the employment at the PHY layer may be substantial, particularly at low and moderate signal-to-noise ratio (SNR). In some cases, hybrid-UEP may also double the battery life compared to current symmetric modulations for the same bit rate. Example techniques discussed herein may be used to increase the spectral efficiency of any communications system which transmits heterogeneous (multi-service) data. Unlike conventional stove-pipe systems, many current communications and network systems carry a variety of information (e.g., video, imagery, voice, and data). Example techniques discussed herein may meet the QoS requirements of the heterogeneous and multiservice data while not wasting energy or sacrificing performance. Hybrid-UEP may avoid the "cliff effect" in which all data transmission cuts out when the channel becomes very poor. Instead, there may be a graceful degradation and the most important data may still be sent through all but the worst channel outages.

Example techniques discussed herein may provide efficient resource utilization techniques for managing heterogeneous multiservice provisioning over wireless channels and networks. To accomplish this goal, cross-layer design may be leveraged. In cross-layer design, the inter-dependencies between various protocol layers may be characterized and exploited while cooperatively optimizing the end-to-end (E2E) performance metrics. In contrast to wired networks, wherein QoS may be assured by separately optimizing each layer in the Open Systems Interconnection (OSI) model, in wireless systems, there may exist a strong interconnection between layers which may yield the layered design approach inefficient. Furthermore, many conventional techniques may only consider a subset of layers of the protocol stack and may not fully utilize techniques available at the lower layers.

Example techniques discussed herein may employ AMM that takes advantage of the differences in the QOS requirements between different types of heterogeneous multiservices (imposed by the upper layers) for improving the spectral utilization efficiency by exploiting the abstraction of the established channel conditions at the PHY layer.

Figure 1:
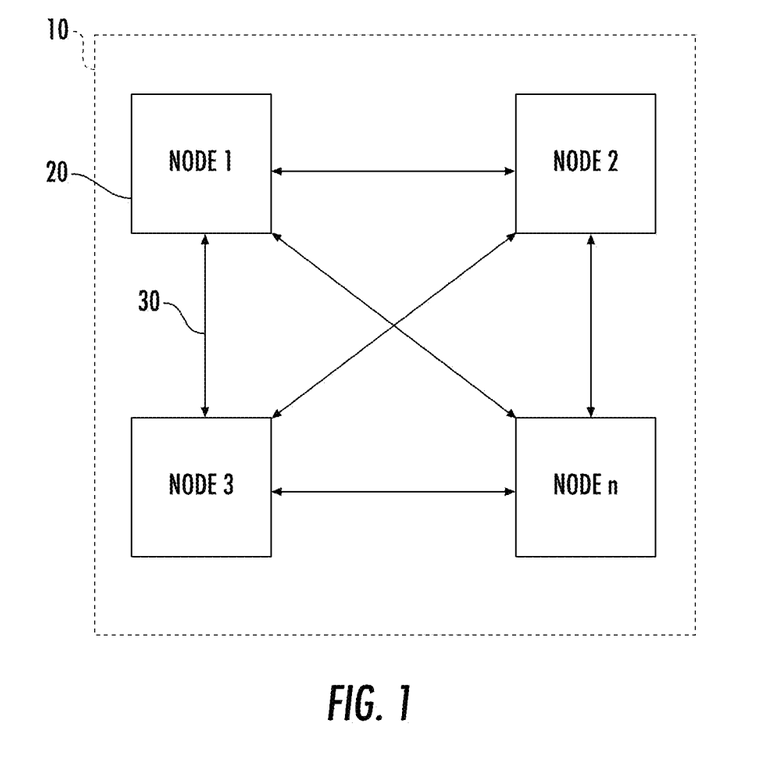
FIG. 1 is a block diagram of an example system having a distributed network architecture.

FIG. 1 is a block diagram of an example system 10 having a distributed network architecture that may be used to implement techniques discussed herein. System 10 may include a plurality of nodes 20 that are each configured to send signals 30 to each of the other nodes 20 and receive signals 30 from each of the other nodes 20. Nodes 20 may be organized in any type of distributed network configuration. In some embodiments, nodes 20 are fixed in their location within the network. In some embodiments, nodes 20 are mobile and are able to move about within the network. In some embodiments, system 10 may include both fixed and mobile nodes. In some embodiments, nodes 20 comprise sensors that may be used to detect objects within an environment.

Figure 2:
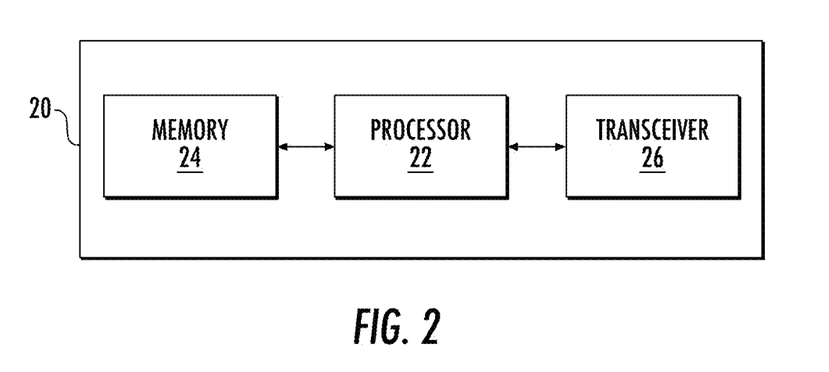
FIG. 2 is a block diagram of an example node in the distributed network architecture shown in FIG. 1.

FIG. 2 is a block diagram of an example of a node 20. As shown, node 20 includes a processor 22 operatively connected to a memory unit 24 and a transceiver 26. In some embodiments, processor 22 is a general purpose processor. In some embodiments, processor 22 is a processor that is specifically programmed to contain instructions therein, readable by the processor, that allow the processor to send/ receive information to/from memory unit 24 and transceiver 26, as well as to cause transceiver 26 to send/receive signals in accordance with embodiments discussed herein. Further, depending on the particular application of the node, e.g., a sensor, node 20 may include more components therein to allow the node to perform functions required by the specific application.

In asymmetric modulation, the signal constellation is pre-distorted to increase resource utilization efficiency when transmitting multi-service, heterogeneous data. By pre-distorting the signal constellation, heterogeneous QoS requirements can be satisfied while not wasting resources. In asymmetric modulation, the shape of the signal constellation may be dictated by the QoS requirements at the APP layer. For cases where the QoS BER or PER requirements are closer to each other, the optimal signal constellation shape is more symmetric. For cases where the QoS BER or PER requirements are farther apart from each other, the optimal signal constellation shape is more asymmetric.

Figure 3:
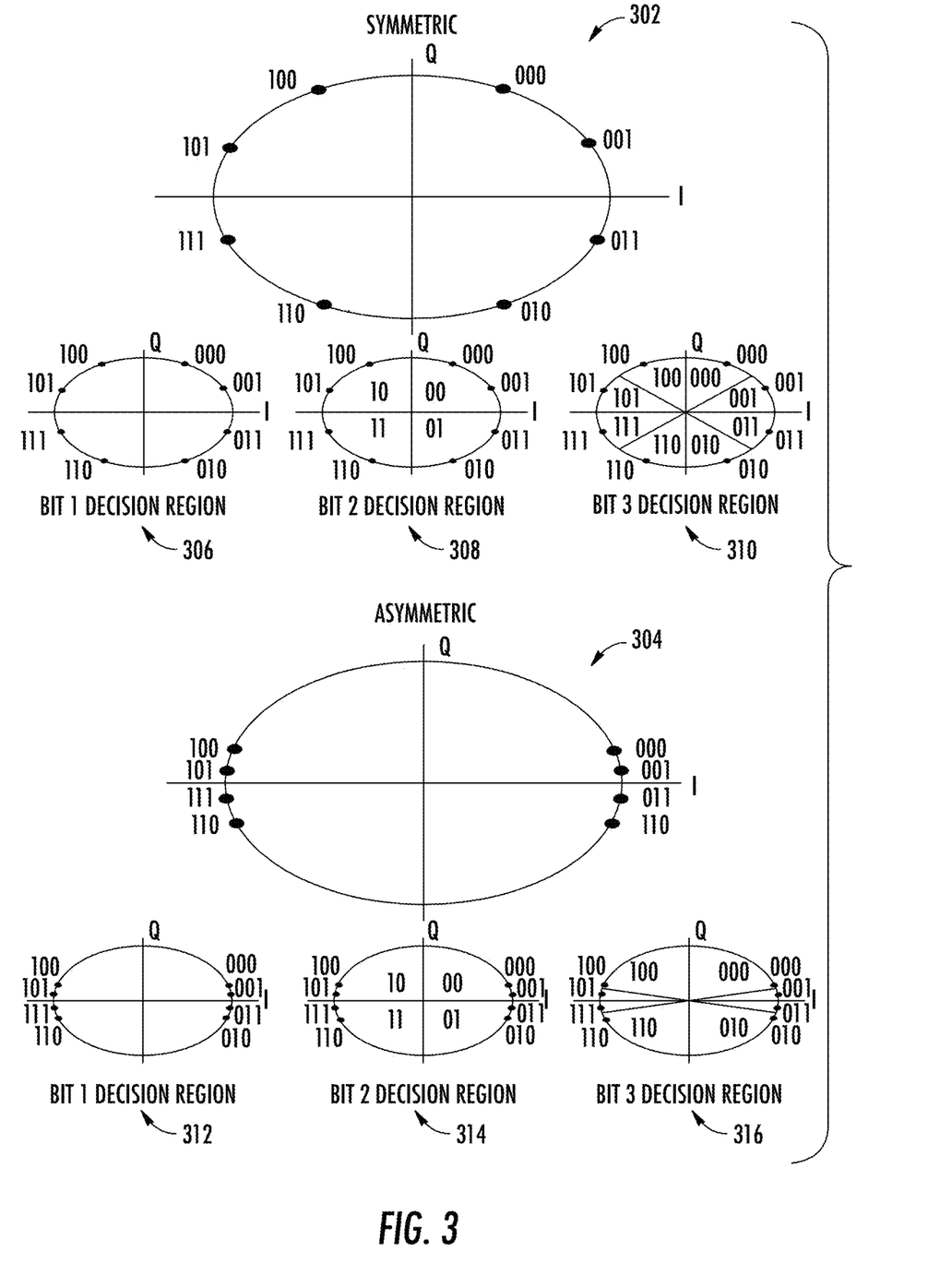
FIG. 3 illustrates a comparison of Symmetric 8-PSK and Asymmetric 8-PSK.

At a receiver, demodulation, symbol-to-bit translation, may be based on pre-defined decision regions. FIG. 3 illustrates a comparison of Symmetric 8-PSK (phase-shift keying) (302) and Asymmetric 8-PSK (304), as shown by constellation diagrams. In FIG. 3, the decision regions for bit 1, bit 2, and bit 3 for both symmetric and asymmetric 8-PSK (phase-shift keying) are shown. As shown, decision region 306 illustrates the decision region for bit 1 for symmetric 8-PSK, decision region 308 illustrates the decision region for bit 2 for symmetric 8-PSK, and decision region 310 illustrates the decision region for bit 3 for symmetric 8-PSK. As shown, decision region 312 illustrates the decision region for bit 1 for asymmetric 8-PSK, decision region 314 illustrates the decision region for bit 2 for asymmetric 8-PSK, and decision region 316 illustrates the decision region for bit 3 for asymmetric 8-PSK. If the transmitted symbol is received in the correct decision region, the symbol may be demodulated correctly. If the transmitted symbol is received in the incorrect decision region due to attenuation, noise, interference, or some other phenomena, the symbol may be demodulated erroneously. Consequently, transmitted symbols closer to the decision region boundary may need less corruption to be received in the incorrect decision region and are more likely to be received in error.

An adaptive demodulation scheme is based on a maximum likelihood (ML) detection rule for each bit. As shown in FIG. 3, for the 8-PSK constellations, the first bit, also known as the most significant bit (MSB), is "0" in the right half plane and "1" in the left half plane. Moreover, if the phase angle between the symbol and the positive x-axis ($\phi$) is between $-(\pi/2)<\phi<(\pi/2)$, "0" may be assigned to the first bit. Similarly, the second bit which represents the next most significant bit is "0" in the upper half plane and "1" in the lower half plane. It may be noted that the second bit may be considered "less important" than the first bit (i.e., the MSB). The complete set of decision rules employed by the demodulator for asymmetric 8-PSK modulation may be denoted as:

(a) For $1^{st}$ bit: If $-(\pi/2)<4)<\phi<(\pi/2)$, $i_1=0$; else $i_1=1$.
(b) For $2^{nd}$ bit: If $0<\phi<\pi$, $i_2=0$; else $i_2=1$.
(c) For $3^{rd}$ bit: If $(\pi/2)\beta<\phi<\pi-(\pi/2)\beta$ or $-\pi+(\pi/2)\beta<\phi<-(\pi/2)\beta$, $i_3=0$; else $i_3=1$.

It may be noted that for asymmetric modulation, ML decoding may be performed on individual bits instead of the received symbol. This may facilitate partial symbol recovery, which increases spectral efficiency and throughput under disadvantaged channel conditions. For symmetric modulation, ML decoding may be executed on the received symbol. Consequently, there is no partial symbol recovery (meaning that either all of the bits or none of the bits are demodulated correctly). Thus, asymmetric modulations may be decoded with lower uncoded BERs (Bit Error Rates) than can symmetric modulations in the low to moderate SNR/CNR regions.

For symmetric 8-PSK, all of the constellation symbols are equidistant in the signal space. Thus, for symmetric 8-PSK, the BER and PER characteristics of each bit are roughly the same. For asymmetric 8-PSK, as the constellation becomes more asymmetric, bit 1 is farther from the decision region and less vulnerable to corruption. However, bit 2 and especially bit 3 may move closer to the decision regions and may be more vulnerable to corruption. In essence, asymmetric modulation provides more protection to the most significant bits (MSBs) at the expense of less protection of the least significant bits (LSBs). In many scenarios, MSBs may be considered more "important" and/or more "significant" than LSBs. Therefore, in accordance with example techniques discussed herein, an asymmetric modulation implementation may need to determine the optimal signal constellation shape at the PHY layer based on the QoS requirements at the APP layer. In accordance with an example embodiment herein, by harmonizing the distinctive QoS requirements for multiservice sources to the shape of the multicast modulation, a significant embedding gain may be produced.

To facilitate determining the optimum $\beta$ value for each modulation scheme, the $\beta$ value that results in the minimum of the maximum $\gamma_{req}^i$ may be decided:

$$\arg\min_{\beta}\{\max_i\{\gamma_{req}^i\}\}$$

For the particular case of 8-PSK, the QoS's may be defined as:
$PB^{(1)} \le 1.0239e-04$
$PB^{(2)} \le 1.02e-02$
$PB^{(3)} \le 6.41e-01$
$\beta \in (0, 0.5], i \in \{1, 2, 3\}$.

Acquiring an optimum $\beta$ value for different modulation schemes may ensure that each modulation scheme maximizes its capability based on the specified QoS requirements.

For adaptive FEC, the constellations symbols are equidistant in the signal space. Unequal error protection may be facilitated by using FEC of various strengths. More important data (i.e., data determined as "more important," for example, based on a predetermined importance threshold value, or based on a subjective input, such as importance of high bits and low bits, or importance of a particular type of data) is protected with stronger coding with more redundancy, less important information (i.e., data determined as "less important") is protected with weaker coding with less redundancy. In accordance with an example embodiment herein, for Adaptive Forward Error Correction Coding (AF-ECC), the symbol rate adapts based on the prevailing channel conditions. However, the symbol shape remains symmetric.

The coded BER is calculated using the uncoded BER for symmetric M-PSK and FEC code parameters (n, k, and t):

$$BER_{Coded} = \sum_{r=t+1}^{n} \frac{n!}{k!(n-k)!}(BER_{Uncoded})^r(1-BER_{Uncoded})^{n-r}$$

where n represents the block size of FEC, k represents the number of information bits in the FEC block, and t represents the number of correctable bits for the FEC block.

The coded PER is calculated using the coded BER:

$$PER_{Coded} = 1 - (1 - BER_{Coded})^{N_p}, \text{ where } N_p \text{ is the packet size.}$$

AMM uses an asymmetric-shaped modulation constellation to provide UEP for different bits within a single modulated symbol. As the constellation becomes more asymmetric, the UEP disparity between the bits becomes greater. More important information may be mapped to the more protected bit positions (e.g., the MSBs) within the modulated symbol, and less important information may be mapped to the less protected bit positions (e.g., the LSBs) within the modulation symbol. In an example embodiment herein, AFECC uses FEC coding of varying code rates. More important information is transmitted using stronger low rate codes with more coding redundacy. Less important information is transmitted using weaker high rate codes with less coding redundacy.

Given that AFECC may perform better in the low carrier-to-noise ratio (CNR) region and AMM may perform better in the moderate to high CNR regions, in an example embodiment herein, a hybrid-UEP scheme employs UEP by AFECC in the low CNR region to provide increased robustness and employs UEP by AMM in the moderate to high CNR regions to increase spectral efficiency.

Experimental results have shown that the gain achieved using adaptive multiresolution modulation (AMM), a form of hierarchical modulation at the physical (PHY) layer is significant, especially at low and moderate carrier-to-noise ratio (CNR). This performance gain is achieved by mapping higher priority buffer bits to higher protected bit positions within the symbol and other bits to less protected bit positions, enabling partial modulated symbol recovery. Because of the partial modulated symbol recovery facilitated by AMM, there is a graceful degradation and the most important data is still able to be sent through all but the worst channel outages.

Simulation results have shown, using the hybrid-UEP scheme discussed herein, significant energy and spectral efficiency gains may be achieved across the entire SNR range. For example, a prototype radio demonstrated the UEP by multiresolution modulation portion. Emulated over-the-air tests confirmed benefits highlighted through simulations.

Figure 4:
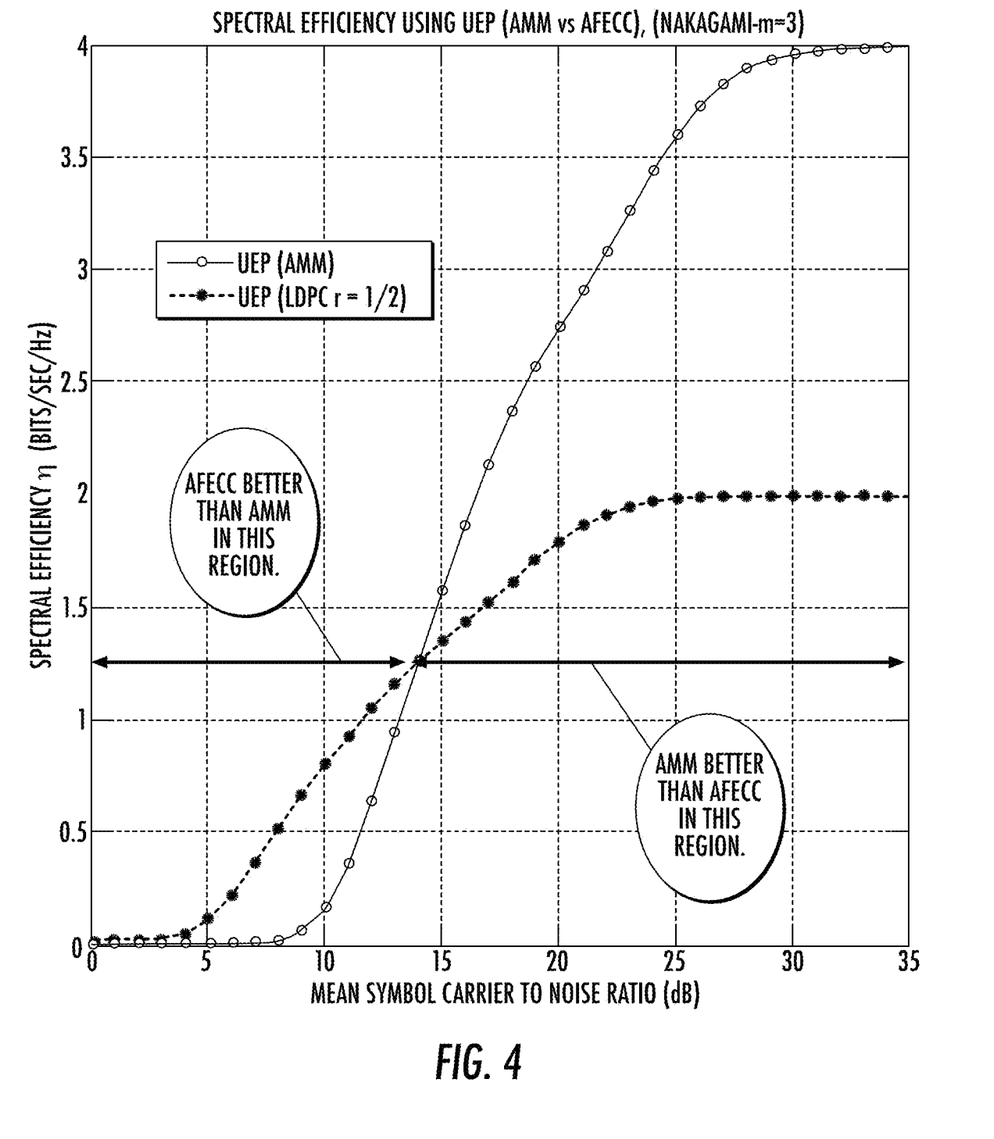
FIG. 4 illustrates an average spectral efficiency for AMM and AFECC.
Figure 5:
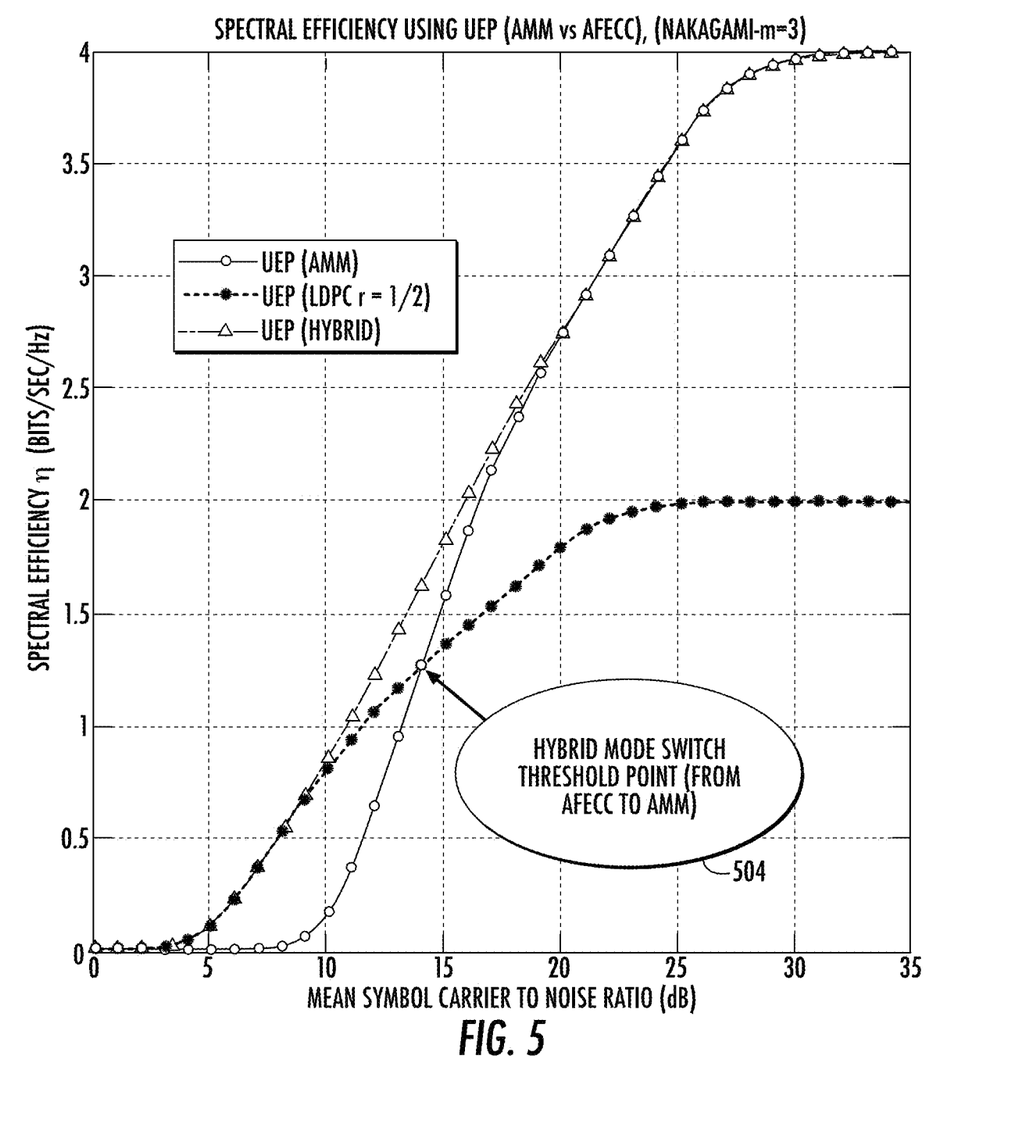
FIG. 5 illustrates an Average Spectral Efficiency for Hybrid-UEP, AMM, and AFECC.

FIGS. 4 and 5 illustrate the experimental results. For example, FIG. 4 illustrates an average spectral efficiency for AMM and AFECC, r≥1/2, using QoS's 1.0239e-04, 1.02e-02, and 6.41e-01 (Nakagami-m=3). FIG. 5 illustrates an Average Spectral Efficiency for Hybrid-UEP, AMM, and ADC using QoS's 1.0239e-04, 1.02e-02, and 6.41e-01 (Nakagami-m=3).

From FIGS. 4 and 5, it may be noted that UEP by means of AFECC, discussed herein, performs better than multiresolution modulation (AMM) in the low SNR region. However, UEP by means of AMM works better than AFECC in the moderate to high CNR regions. AFECC coding works well in the low CNR region, but it is limited in spectral efficiency in the moderate to high CNR range due to the redundancy of the FEC. Conversely, AMM is limited in the low CNR region due to the lack of coding redundancy. However, as the CNR increases, AMM is able to maximize the spectral efficiency in the moderate to high CNR regions. Given that AFECC performs better in the low CNR region and AMM performs better in the moderate to high CNR regions, the hybrid-UEP scheme discussed herein was created which employs UEP by AFECC in the low CNR region to provide increased robustness and UEP by AMM in the moderate to high CNR regions to increase spectral efficiency.

As shown in FIG. 5, a hybrid mode switch threshold point (504) may be used to determine when to switch modes, based on a determination of a location (e.g., low or moderate to high region) in values of CNR, according to an example embodiment.

Figure 6:
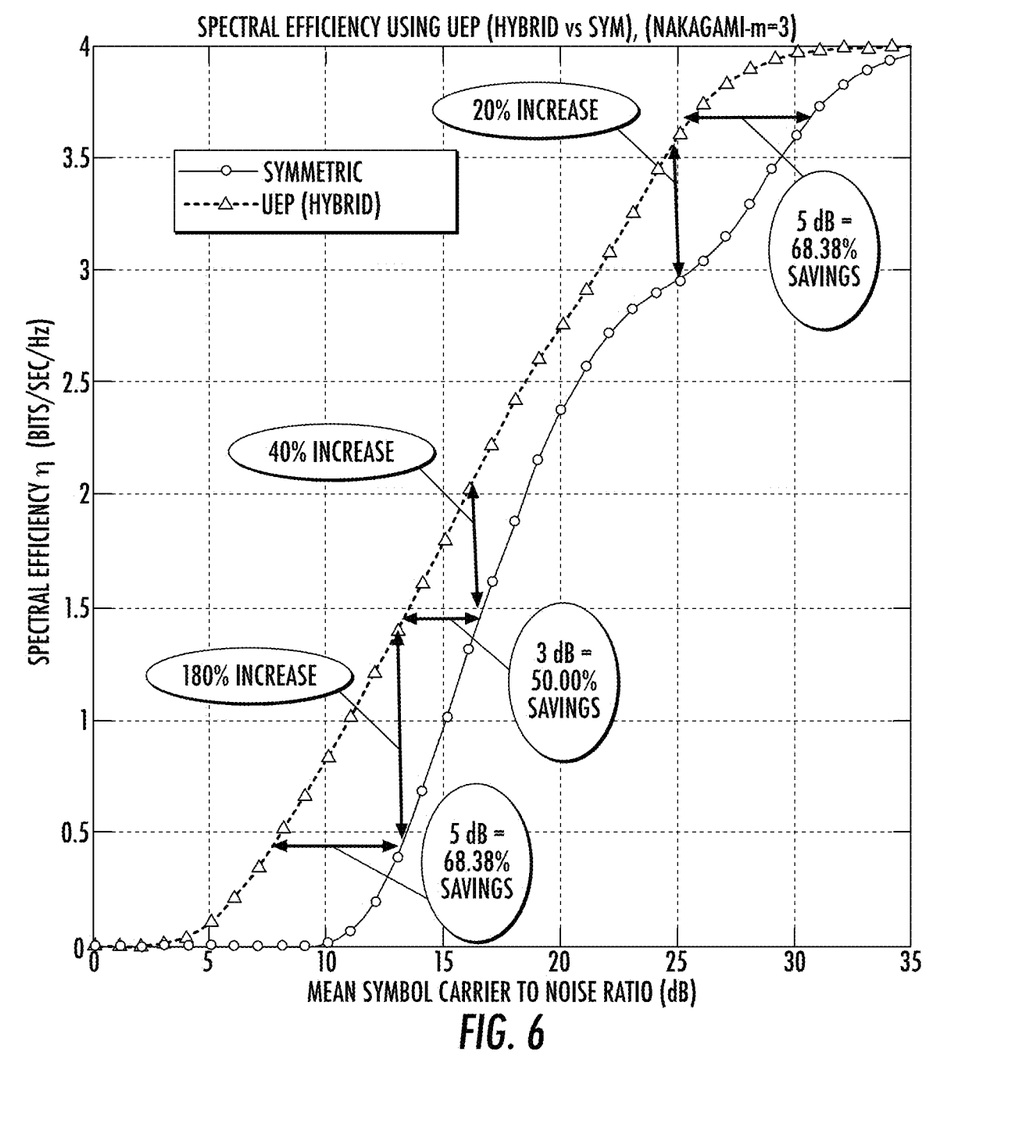
FIG. 6 illustrates average spectral efficiency for example Hybrid-UEP and symmetric (SYM) schemes.

FIG. 6 illustrates average spectral efficiency for the Hybrid-UEP and symmetric (SYM) schemes using QoS's 1.0239e-04, 1.02e-02, and 6.41e-01 (Nakagami-m=3). As illustrated in FIG. 6, using the hybrid-UEP scheme discussed herein, significant energy and spectral efficiency gains may be achieved across the entire SNR range. As shown in FIG. 6, the spectral efficiency improvements are largest in the low SNR region and increased as much as one hundred eighty percent (180%). The spectral efficiency gain in the high SNR region is roughly twenty percent (20%). The energy savings offered by the hybrid-UEP scheme discussed herein is as large as sixty-eight percent (68%) in both the low and high SNR regions. However, in general, the spectral efficiency gains are greatest in the low SNR region and the energy efficiency gains are greatest in the high SNR region.

Figure 7:
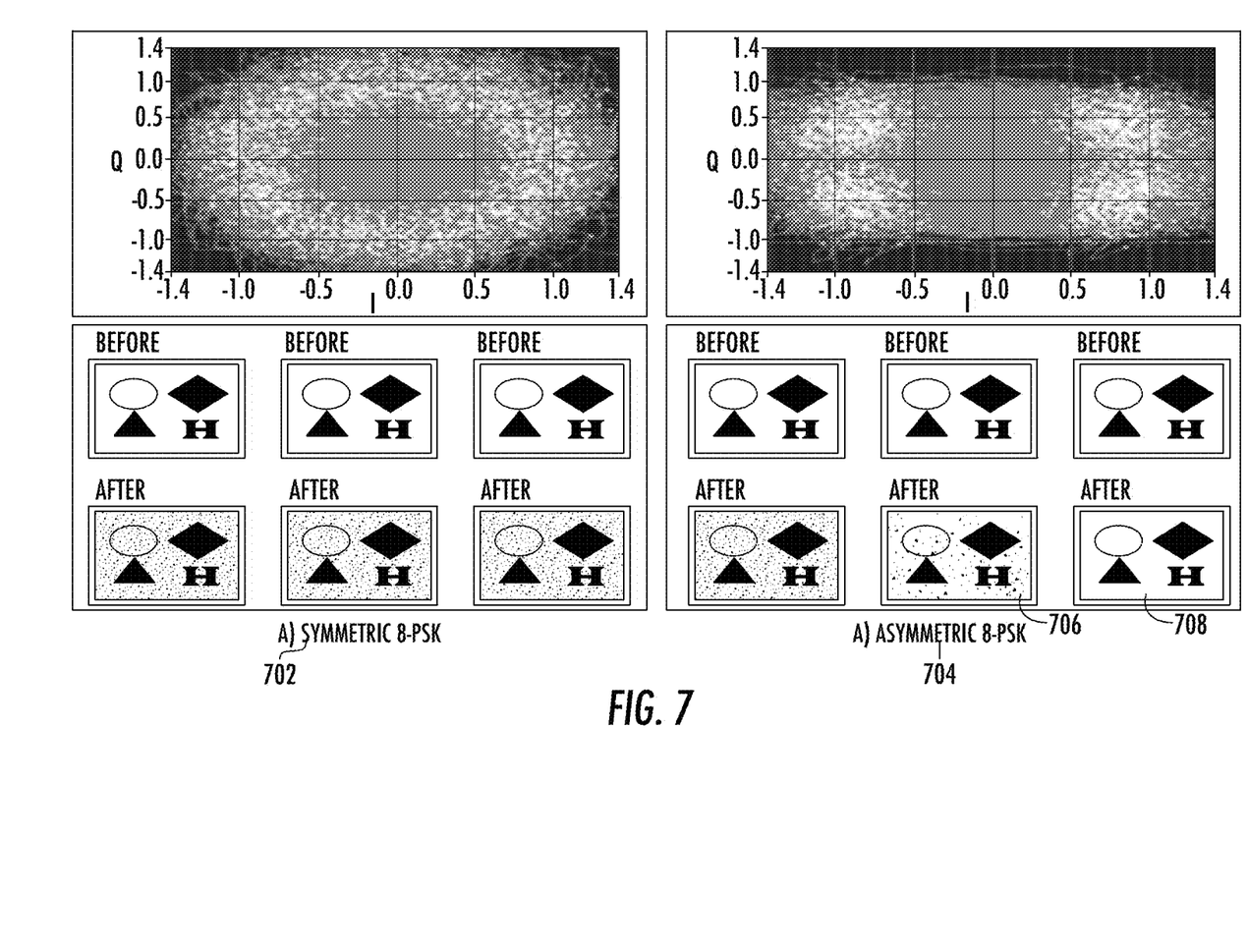
FIG. 7 illustrates a received I-Q constellation graph.
Figure 8:
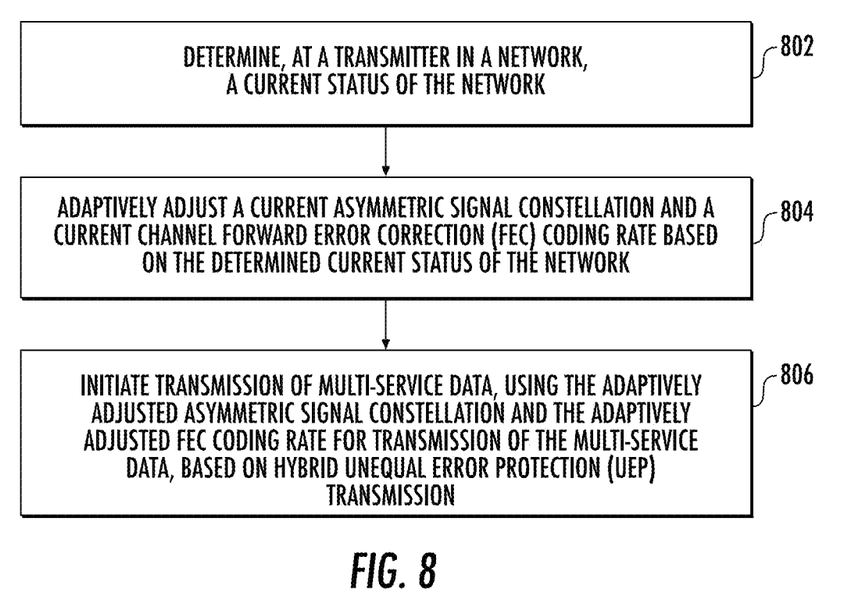
FIG. 8 is a flowchart illustrating example operations of the system of FIG. 2, according to example embodiments.

FIG. 7 illustrates the received I-Q constellation graph and thumbnail images at SNR=6 decibels (dB) for 8-PSK. As shown, FIG. 7 illustrates a received I-Q constellation graph and thumbnail image for a) symmetric 8-PSK, (β=0.5 (702), and b) Asymmetric 8-PSK, (β=0.3 (SNR=6 dB) (704). In FIG. 8, from the I-Q constellation graph, it may be noted that the received constellation using asymmetric modulation 03=0.3) (704) is less affected by the attenuation than the symmetric modulation ((3=0.5) (702). Consequently, the thumbnail images received using asymmetric modulation may have better perceived quality than those of the symmetric modulation. While apparent for bit 1, the improvement is evident for thumbnails representing bit 2 (706) and bit 3 (708). For the symmetric constellation, the receiver method of failure is an inability to maintain frequency and phase lock. For the asymmetric modulation, in all but the most unacceptable circumstances, frequency and phase lock is preserved because the most protected bit stream is easily demodulated.

Using the hybrid-UEP approach discussed herein, the spectral efficiency may improve across the entire CNR range. Using AFECC in the low CNR region provides additional robustness, while AMM in the moderate to high CNR regions may provide enhanced spectral efficiency. The hybrid-UEP also outperforms either AFECC or AMM alone.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

FIG. 8 is a flowchart illustrating example operations of the system of FIG. 2, according to example embodiments. As shown in the example of FIG. 8, at a transmitter in a network, a current status of the network may be determined (802).

A current asymmetric signal constellation and a current channel Forward Error Correction (FEC) coding rate may be adaptively adjusted based on the determined current status of the network (804). Transmission of multi-service data may be initiated, using the adaptively adjusted asymmetric signal constellation and the adaptively adjusted FEC coding rate for transmission of the multi-service data, based on hybrid Unequal Error Protection (UEP) transmission (806).

For example, a hybrid mode switch threshold point value based on a carrier-to-noise ratio (CNR) may be determined. For example, as shown in FIG. 5, the hybrid mode switch threshold point (504) may be used to determine when to switch modes, based on a determination of a location (e.g., low or moderate to high region) in values of CNR.

For example, the transmission of a first portion of the multi-service data may be initiated using Unequal Error Protection (UEP) by channel coding in an area lower than the hybrid mode switch threshold point value, based on a current value of the CNR.

For example, the transmission of a second portion of the multi-service data may be initiated using Unequal Error Protection (UEP) by Adaptive Multiresolution Modulation (AMM) in an area above the hybrid mode switch threshold point value.

For example, determining the current status of the network may include determining a channel impairment in the network.

For example, determining the current status of the network may include determining an improvement in a condition of the network following a channel impairment in the network.

For example, adaptively adjusting the current asymmetric signal constellation may include modifying a size of the current asymmetric signal constellation in use for transmitting at the transmitter.

For example, adaptively adjusting the current asymmetric signal constellation may include modifying a shape of the current asymmetric signal constellation in use for transmitting at the transmitter.

For example, initiating transmission of the multi-service data may include improving spectral utilization efficiency by transmitting the multi-service data, using the adaptively adjusted asymmetric signal constellation and the adaptively adjusted FEC coding rate for transmission of the multi-service data, based on hybrid UEP.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

For example, the one or more processors (e.g., hardware device processors) may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

It will be understood that many additional changes in the details, materials, steps and arrangement of parts, which have been herein described and illustrated to explain the nature of the invention, may be made by those skilled in the art within the principle and scope of the invention as expressed in the appended claims.

The invention claimed is:

1. A method of providing Unequal Error Protection (UEP) for heterogeneous multi-service provisioning, the method comprising:
   determining, at a transmitter in a network, a current status of the network;
   adaptively adjusting a current asymmetric signal constellation and a current channel Forward Error Correction (FEC) coding rate based on the determined current status of the network;
   initiating transmission of multi-service data, using the adaptively adjusted asymmetric signal constellation and the adaptively adjusted FEC coding rate for the transmission of the multi-service data, based on hybrid Unequal Error Protection UEP transmission;
   determining a hybrid mode switch threshold point value based on a carrier-to-noise ratio (CNR);
   initiating transmission of a first portion of the multi-service data using UEP by channel coding in an area lower than the hybrid mode switch threshold point value, based on a current value of the CNR; and
   initiating the transmission of a second portion of the multi-service data using UEP by Adaptive Multiresolution Modulation (AMM) in an area above the hybrid mode switch threshold point value.

2. The method of claim 1, wherein determining the current status of the network includes determining a channel impairment in the network.

3. The method of claim 1, wherein determining the current status of the network includes determining an improvement in a condition of the network following a channel impairment in the network.

4. The method of claim 1, wherein adaptively adjusting the current asymmetric signal constellation includes modifying a size of the current asymmetric signal constellation in use for transmitting at the transmitter.

5. A method of providing Unequal Error Protection (UEP) for heterogeneous multi-service provisioning, the method comprising:
   determining, at a transmitter in a network, a current status of the network;
   adaptively adjusting a current asymmetric signal constellation and a current channel Forward Error Correction (FEC) coding rate based on the determined current status of the network, wherein adaptively adjusting the current asymmetric signal constellation includes modifying a shape of the current asymmetric signal constellation in use for transmitting at the transmitter; and
   initiating transmission of multi-service data, using the adaptively adjusted asymmetric signal constellation and the adaptively adjusted FEC coding rate for the transmission of the multi-service data, based on hybrid Unequal Error Protection UEP transmission.

6. The method of claim 5, wherein initiating transmission of the multi-service data includes improving spectral utilization efficiency by transmitting the multi-service data, using the adaptively adjusted asymmetric signal constellation and the adaptively adjusted FEC coding rate for the transmission of the multi-service data, based on the hybrid UEP.

7. A non-transitory computer-readable storage medium storing instructions that are executable by at least one hardware device processor to provide Unequal Error Protection (UEP) for heterogeneous multi-service provisioning by:
   determining, at a transmitter in a network, a current status of the network;
   adaptively adjusting a current asymmetric signal constellation and a current channel Forward Error Correction (FEC) coding rate based on the determined current status of the network;
   initiating transmission of multi-service data, using the adaptively adjusted asymmetric signal constellation and the adaptively adjusted FEC coding rate for the transmission of the multi-service data, based on hybrid Unequal Error Protection (UEP) transmission; and
   wherein the instructions are executable by the at least one hardware device processor to:
   determine a hybrid mode switch threshold point value based on a carrier-to-noise ratio (CNR);
   initiate transmission of a first portion of the multi-service data using UEP by channel coding in an area lower than the hybrid mode switch threshold point value, based on a current value of the CNR; and
   initiate transmission of a second portion of the multi-service data using UEP by Adaptive Multiresolution Modulation (AMM) in an area above the hybrid mode switch threshold point value.

8. The non-transitory computer-readable storage medium of claim 7, wherein determining the current status of the network includes determining a channel impairment in the network.

9. The non-transitory computer-readable storage medium of claim 7, wherein determining the current status of the network includes determining an improvement in a condition of the network following a channel impairment in the network.

10. The non-transitory computer-readable storage medium of claim 7, wherein adaptively adjusting the current asymmetric signal constellation includes modifying a size of the current asymmetric signal constellation in use for transmitting at the transmitter.

11. A non-transitory computer-readable storage medium storing instructions that are executable by at least one hardware device processor to provide Unequal Error Protection (UEP) for heterogeneous multi-service provisioning by:
   determining, at a transmitter in a network, a current status of the network;
   adaptively adjusting a current asymmetric signal constellation and a current channel Forward Error Correction (FEC) coding rate based on the determined current status of the network, wherein adaptively adjusting the current asymmetric signal constellation includes modifying a shape of the current asymmetric signal constellation in use for transmitting at the transmitter; and
   initiating transmission of multi-service data, using the adaptively adjusted asymmetric signal constellation and the adaptively adjusted FEC coding rate for the transmission of the multi-service data, based on hybrid UEP transmission.

12. The non-transitory computer-readable storage medium of claim 11 wherein initiating transmission of the multi-service data includes improving spectral utilization efficiency by transmitting the multi-service data, using the adaptively adjusted asymmetric signal constellation and the adaptively adjusted FEC coding rate for the transmission of the multi-service data, based on the hybrid UEP.

13. A system for providing Unequal Error Protection (UEP) for heterogeneous multi-service provisioning, the system comprising:
   a transmitter in a network, the transmitter including:
      at least one hardware device processor; and
      a non-transitory computer-readable storage medium storing instructions that are executable by the at least one hardware device processor to:
         determine a current status of the network;
         adaptively adjust a current asymmetric signal constellation and a current channel Forward Error Correction (FEC) coding rate based on the determined current status of the network;
         initiate transmission of multi-service data, using the adaptively adjusted asymmetric signal constellation and the adaptively adjusted FEC coding rate for the transmission of the multi-service data, based on hybrid UEP transmission; and
   wherein the instructions are executable by the at least one hardware device processor to:
   determine a hybrid mode switch threshold point value based on a carrier-to-noise ratio (CNR);
   initiate transmission of a first portion of the multi-service data using UEP by channel coding in an area lower than the hybrid mode switch threshold point value, based on a current value of the CNR; and
   initiate transmission of a second portion of the multi-service data using UEP by Adaptive Multiresolution Modulation (AMM) in an area above the hybrid mode switch threshold point value.

14. The system of claim 13, wherein determining the current status of the network includes determining a channel impairment in the network.

15. The system of claim 13, wherein determining the current status of the network includes determining an improvement in a condition of the network following a channel impairment in the network.

16. The system of claim 13, wherein adaptively adjusting the current asymmetric signal constellation includes modifying a size of the current asymmetric signal constellation in use for transmitting at the transmitter.

17. The system of claim 13, wherein initiating transmission of the multi-service data includes improving spectral utilization efficiency by transmitting the multi-service data, using the adaptively adjusted asymmetric signal constellation and the adaptively adjusted FEC coding rate for the transmission of the multi-service data, based on the hybrid UEP.

\* \* \* \* \*